United States Patent
Kossakovski et al.

(10) Patent No.: US 7,248,763 B1
(45) Date of Patent: Jul. 24, 2007

(54) OPTICAL RESONATORS WITH REDUCED OH-CONTENT

(75) Inventors: Dmitri A. Kossakovski, S. Pasadena, CA (US); Vladimir Ilchenko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 440 days.

(21) Appl. No.: 10/885,892

(22) Filed: Jul. 6, 2004

Related U.S. Application Data

(60) Provisional application No. 60/485,174, filed on Jul. 3, 2003.

(51) Int. Cl.
 *G02B 6/26* (2006.01)
 *G02B 6/42* (2006.01)
(52) U.S. Cl. .......................... 385/32; 385/15
(58) Field of Classification Search ........... 385/15, 385/32
 See application file for complete search history.

(56) References Cited

U.S. PATENT DOCUMENTS

| | | | |
|---|---|---|---|
| 4,515,612 A | 5/1985 | Burrus, Jr. et al. | |
| 4,685,945 A * | 8/1987 | Freund | 65/426 |
| 4,689,065 A * | 8/1987 | Krause | 65/407 |
| 5,136,818 A * | 8/1992 | Bramson | 451/6 |
| 5,723,856 A | 3/1998 | Yao et al. | |
| 5,777,778 A | 7/1998 | Yao | |
| 5,917,179 A | 6/1999 | Yao | |
| 5,929,430 A | 7/1999 | Yao et al. | |
| 6,138,076 A | 10/2000 | Graf et al. | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |
| 6,499,318 B1 * | 12/2002 | Lemaire et al. | 65/379 |
| 6,535,328 B2 | 3/2003 | Yao | |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,762,869 B2 | 7/2004 | Maleki et al. | |
| 6,795,481 B2 * | 9/2004 | Maleki et al. | 372/108 |
| 6,901,189 B1 * | 5/2005 | Savchenkov et al. | 385/39 |

(Continued)

FOREIGN PATENT DOCUMENTS

WO WO0196936 12/2001

OTHER PUBLICATIONS

K. Tsujikawa et al.; Reduction of OH absorption loss by deuteration in $Na_2O$-$Al_2O_3$-$SiO_2$ glass fibre; Oct. 15, 1998; Electronics Letters, vol. 34, No. 21.

(Continued)

*Primary Examiner*—Michelle Connelly-Cushwa
*Assistant Examiner*—Rhonda S. Peace
(74) *Attorney, Agent, or Firm*—Fish & Richardson P.C.

(57) ABSTRACT

This application describes optical resonators substantially free of hydrogen and hydroxyl radicals and related fabrication techniques.

5 Claims, 2 Drawing Sheets

U.S. PATENT DOCUMENTS

| | | |
|---|---|---|
| 6,904,772 B2 * | 6/2005 | Berkey et al. ................. 65/412 |
| 6,922,497 B1 * | 7/2005 | Savchenkov et al. ......... 385/15 |
| 2002/0018611 A1 | 2/2002 | Maleki et al. |
| 2002/0172457 A1 * | 11/2002 | Tapalian et al. .............. 385/30 |
| 2003/0012504 A1 | 1/2003 | Iltchenko |
| 2004/0033023 A1 * | 2/2004 | Tallent et al. ................. 385/43 |
| 2004/0037526 A1 * | 2/2004 | Campion et al. ........... 385/123 |
| 2004/0091212 A1 * | 5/2004 | Strecker et al. .............. 385/50 |
| 2005/0044893 A1 * | 3/2005 | Coon et al. .................. 65/32.1 |

OTHER PUBLICATIONS

Larry R. Dalton; Polymeric electro-optic materials: optimization of electro-optic activity, minimization of optical loss, and fine-tuning of device performance; Mar. 2000; Opt. Eng. 39(3) pp. 589-595.

L.E. Myers, et al.; Quasi-phase-matched optical parametric oscillators in bulk periodically poled $LiNbO_3$; Nov. 1995; J.Opt. Soc. Am. B/vol. 12, No. 11; pp. 2102-2116.

* cited by examiner

OPTICAL RESONATORS WITH REDUCED OH-CONTENT

This application claims the benefit of U.S. Provisional Patent Application No. 60/485,174 entitled "Process to improve quality factor of a micro-resonator" and filed Jul. 3, 2003, the entire disclosure of which is incorporated herein by reference as part of the specification of this application.

The research and development for inventions described in this application received funding under ATP Contract No. 70NANB1H3054. The U.S. Government may have rights to certain technical features described in this application.

BACKGROUND

This application relates to optical resonators such as micro resonators and their fabrication.

Optical materials may contain certain impurities that absorb light and thus cause undesired optical losses. As an example, many compounds having the chemical group OH are optically absorbing at the optical wavelengths in the infrared region including the 1.3 microns 1.55 microns for optical communications and other applications. Examples of such compounds include water ($H_2O$) and various hydroxyl radicals. Therefore, it is desirable to reduce the OH content in optical components and devices for optical applications in the IR spectral range.

SUMMARY

This application describes fabrication methods and optical resonators to achieve a low OH content. For example, a method for fabricating a resonator is described to include processing an optical material by using deuterium to replace hydrogen to form an optical resonator to minimize a compound that comprises OH in the optical resonator. As another example, a device is described to include an optical resonator structured to support at least one whispering gallery mode. The optical material of the resonator includes deuterium and is substantially free of a compound that comprises OH.

DETAILED DESCRIPTION

The features described here are in part based on the recognition that certain optical resonators are sensitive to optical absorption in a region where the optical resonator modes are present. Such optical absorption causes loss of light in the optical resonator modes and thus reduces the quality factor of the resonator. For example, whispering-gallery mode (WGM) resonators made of glass materials are susceptible to degradation in the quality factors caused by optical absorption by water ($H_2O$) and hydroxyl (OH) radicals. This is in part because water and hydrogen gas are often present during processing of the glass materials to fabricate the WGM resonators and the processing usually leaves residual water or hydroxyl radicals in the final resonators. WGM resonators are different from other resonators in that the modes in the WGM resonators exist near the surface of the equator in a thin layer. Presence of water and hydroxyl radicals on or near the surface of the resonator hence may cause significant reduction in the quality factor.

Main sources of the residual water and hydroxyl radicals in the finished glass resonators include the use of the hydrogen gas and water-based polishing slurry during the fabrication. Water and hydroxyl radicals inside glass media are known to cause optical absorption at IR wavelengths used in telecommunication applications such as the wavelengths around 1310 nm and 1550 nm. In fabricating WGM micro resonators from glass materials, a number of steps may expose the resonator material to water, hydrogen or hydroxyls in a form of atmospheric water vapor, water-based polishing slurries, hydrogen/oxygen flame and others. Experimental observations show that contamination by water and hydroxyl can limit the effective Q factors of the WGM micro resonators.

Deuterium D is the isotope of hydrogen. Heavy water ($D_2O$) and OD groups that include the OD content are known to exhibit optical absorption at the IR wavelengths at about 2 to 4 times less than that of water and OH groups. Therefore, deuterium may be used to replace hydrogen in fabrication of optical resonators to reduce the OH content in the final resonators. In addition, the finished resonators may be further treated with deuterium to minimize the OH content in the resonators, especially near the surface of a resonator where the WG modes are present.

Figure 1:
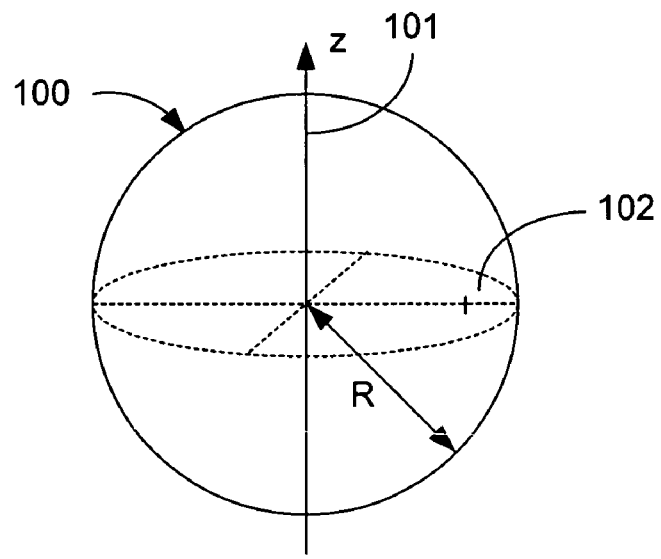
FIG. 1 shows a solid spherical WGM resonator formed to comprise deuterium to displace and minimize the OH content.
Figure 2:
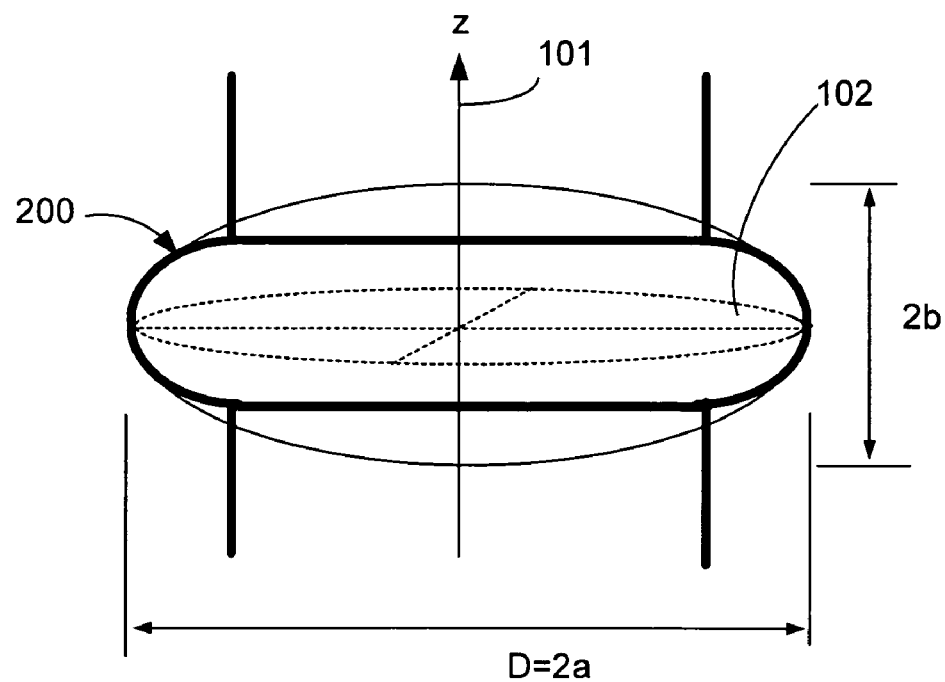
FIG. 2 shows a non-spherical WGM resonator in a shape of a spheroid and formed to comprise deuterium to displace and minimize the OH content.
Figure 3:
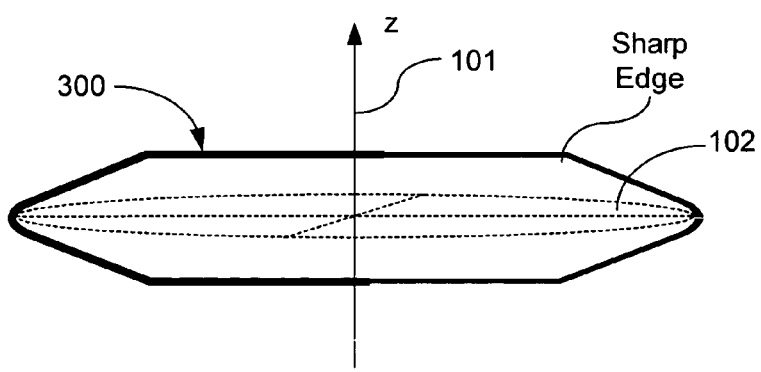
FIG. 3 shows another exemplary WGM resonator which has a non-spherical exterior in a general conic shape and is formed to comprise deuterium to displace and minimize the OH content.

WGM resonators may be made in different geometries to support a circular optical path with exterior curved surfaces to spatially confine the modes in the direction perpendicular to the plane in which the circular optical path is located. FIGS. 1, 2, and 3 illustrate three exemplary geometries for implementing WGM resonators.

FIG. 1 shows a spherical WGM resonator 100 which is a solid dielectric sphere. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
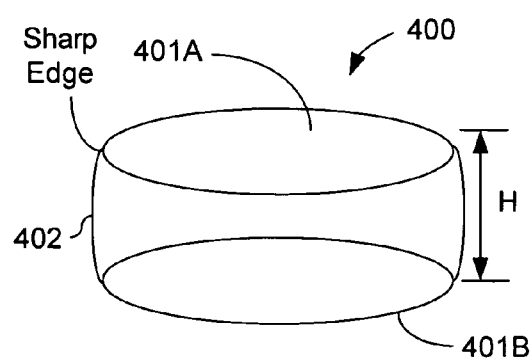
FIGS. 4A, and 4B show a disk-shaped WGM resonator and a ring-shaped WGM resonator, respectively and are formed to comprise deuterium to displace and minimize the OH content.
Figure 4B:
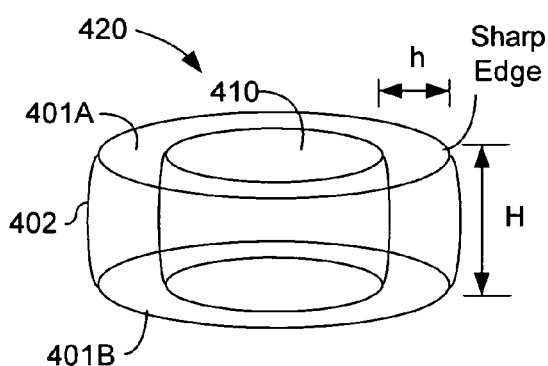

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 13C, 14A, and 14B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

In general, an optical coupler is used to couple optical energy into or out of the WGM resonator by evanescent coupling. Angle-polished fiber tips, waveguides, and GRIN lenses or prisms may be used as the optical couplers. In addition, evanescent couplers such as an coupler formed from photonic bandgap materials may be used for coupling with the resonators in the integrated OEOs.

In fabrication of the above and other WGM resonators, an optical material such as a glass material may be exposed to water and hydrogen in shaping the material under heat produced by a hydrogen flame. The reaction between hydrogen and oxygen produces water vapor which may be trapped in the optical material. As an example, a silica glass material such as a silica fiber preform may be heated by a hydrogen torch to melt the silica fiber perform to form a sphere or a spheroid for the WGM resonators. The surfaces of the WGM resonators may also be polished to reduce the surface roughness and the associated optical loss caused by scattering at the surface. Conventionally, such polishing is usually carried out by using water-based polishing slurry and such exposes the resonators to water and other OH groups.

Therefore, the regular water ($H_2O$) and hydrogen gas ($H_2$) used in these fabrication steps may be replaced with heavy water ($D_2O$) and deuterium gas ($D_2$), respectively, depending on the needs of a particular process. Deuteration is known to reduce optical absorption at the wavelengths of interest by a factor of 2 to 4. The quality factor of a whispering gallery mode resonator with hydrogen substantially replaced with deuterium can increase by the same factor if there are no other loss mechanisms limiting the Q at this level.

This deuteration can be either incorporated in the processing steps or can be performed after the shaping of the resonator is complete. An example of incorporation of deuteration in the processing step would be switching from $H_2O$ polishing slurries to $D_2O$ bases slurries. Another example is to use deuterium ($D_2$) gas instead of hydrogen gas to form flame mixture with oxygen. Such deuteration does not require different tooling and processing steps and hence can be easily implemented.

Different from other optical resonators, the WG modes in WGM resonators are at the surfaces of the resonators and hence it is particularly important to reduce or eliminate absorbing OH groups near the surfaces of the resonators. To achieve this, finished resonators and other finished optical parts may be exposed to hot $D_2$ gas or $D_2O$ vapor to expel any residual water or hydrogen in the resonators and finished optical parts, especially for the regions near the surfaces. This post-processing treatment and deuterium-based processing steps minimizes the undesired OH content in the final resonators and optical parts. In general, a process that displaces hydrogen with deuterium in glass or prevents hydrogen from getting into glass may be used to an improved Q factor of the resonators. Such a process can saturate the bulk and surface of the glass with deuterium without degradation of the surface quality of the microresonator.

Tests were conducted by switching from H2/O2 flame to D2/O2 flame in processing silica resonators with low OH contents. Measured absorptions showed at least two fold increase in the resonator Q values from about $4 \times 10^9$ in resonators fabricated by using a hydrogen flame to values exceeding $8.6 \times 10^9$ in resonators fabricated by using a deuterium flame.

Only a few implementations are disclosed. However, it is understood that variations and enhancements may be made.

What is claimed is what is described and illustrated, including:

1. A method, comprising:
   processing an optical material by using deuterium to replace hydrogen to form an optical resonator to minimize a compound that comprises OH in the optical resonator; and
   polishing the optical material with a $D_2O$ based slurry.

2. A method as in claim 1, further comprising exposing the optical material to a flame produced from a mixture of a deuterium gas and oxygen.

3. A method as in claim 1, further comprising exposing the optical resonator to a hot deuterium gas or a hot $D_2O$ vapor to reduce water and hydroxyl radicals in the optical material.

4. A method for fabricating an optical resonator, comprising:
   mixing a $D_2$ gas and an oxygen gas to produce a flame to heat a glass material;
   shaping the heated glass material to form an optical resonator; and
   polishing the optical resonator with a $D_2O$-based polishing slurry.

5. A method as in claim 4, further comprising exposing the optical resonator to a heated $D_2$ gas or $D_2O$ vapor to minimize a compound that comprises OH in the optical resonator.

* * * * *